United States Patent [19]

Davidson

[11] Patent Number: 4,959,981
[45] Date of Patent: Oct. 2, 1990

[54] PORTABLE VEHICLE SECURITY LOCK WITH ILLUMINATION MEANS

[76] Inventor: Roger Davidson, 10320 Rockville Pike, Rockville, Md. 20852

[21] Appl. No.: 296,702

[22] Filed: Jan. 13, 1989

[51] Int. Cl.$^5$ .................... E05B 41/00; E05B 65/12
[52] U.S. Cl. ................................ 70/238; 70/239; 70/432; 70/DIG. 59
[58] Field of Search ............... 70/14, 238, 239, 432, 70/DIG. 59, 211, 212, 225, 226, 94; 292/339; 362/80, 109, 802

[56] References Cited

U.S. PATENT DOCUMENTS

| 1,193,679 | 8/1916 | Fox | 70/238 X |
|---|---|---|---|
| 3,690,131 | 9/1972 | Davis | 70/238 X |
| 4,628,421 | 12/1986 | Saar | 362/238 |
| 4,638,412 | 1/1987 | Weigert | 362/276 X |
| 4,683,741 | 8/1987 | Fields | 70/432 |
| 4,741,185 | 5/1988 | Weinert et al. | 70/57 |

Primary Examiner—Lloyd A. Gall
Attorney, Agent, or Firm—Cushman, Darby & Cushman

[57] ABSTRACT

A portable antitheft locking mechanism for a motor vehicle steering wheel and brake pedal, e.g., a J-bar, having plural lighting elements, such as light emitting diodes, which generally indicate the profile of the locking mechanism so that it may be seen in darkness before forcible entry. The J-bar includes an independent source of power, such as a battery, which energizes the lighting elements either when the J-bar engages the vehicle member or when the access lock is secured, or both. The lighting elements provide means to inform the thief of the J-bar during darkness so as to deter his ill-intended efforts and spare the owner of unnecessary physical damage resulting from forcible entry. The J-bar preferably includes contact switch element which closes upon engagement with the steering wheel and/or a microswitch responsive to securement of an access lock on the mechanism to activate the lights thereby to conserve source when not in use. The lighting elements may be energized continuously, periodically, or sequentially. A photoswitch may also be employed to deactive the lighting elements during daylight conditions.

7 Claims, 2 Drawing Sheets

PORTABLE VEHICLE SECURITY LOCK WITH ILLUMINATION MEANS

BACKGROUND OF THE INVENTION

This invention pertains to mechanical security locks, but more specifically, to vehicle antitheft locks of the type which engage a motor vehicle control mechanism, such as a brake pedal and steering wheel.

Mechanical security locks, such as J-bars, have provided an effective antitheft measure, and as a result, several improvements have been made to increase their effectiveness since initial introduction. For example, improvements have been made to key cylinders, steering wheel shackle design, telescoping adjustments, materials, and the like, to frustrate attempts of would be thief. Reference is made to U.S. Pat. Nos. 4,730,470 to Zane et al., 3,550,409 to Pariser, 4,779,435 to Farrow, 3,990,280 to Jahn, 3,690,131 to Davis, and 4,432,432 to Martin. This list is non-exhaustive of portable vehicle locks.

Mechanical locks, although effective in preventing theft, do not always deter "attempted" theft which invariably results in physical damage to the vehicle to the owner's loss. To explain, most theft attempts occur in darkness under conditions where the thief does not discover the mechanical lock until he gains access to the vehicle. In gaining access, the thief usually forcibly destroys the door lock and/or window using such implements as a crowbar, tire rod, or other crude tool. Not until after entry does the thief recognize his futile effort, and like many frustrated criminals, he takes what he can from inside the vehicle and abandons his effort to steal the vehicle. Unfortunately, the vehicle owner is left with the expense to repair the physical damage.

Moreover, many prior mechanical locking devices lack means visually to signal securement of the associated access lock. Visually, the locking device "seems" secure, but in fact, may be unintentionally left unsecured by the user, particularly when an access key and cylinder are utilized. Some prior design address this problem by arranging the shackle in a manner where it "falls off" the steering wheel when unsecured. However, those mechanical locks which are not utilized with steering wheel or do not secure a member against gravity do not have this advantage. Accordingly, some other type of signalling means would be advantageous.

Accordingly, at least one objective of the present invention is to provide a portable mechanical locking device for use with a motor vehicle which includes means for indicating its presence in low lighting conditions.

It is another objective of the present invention to provide a portable locking device not only having means for indicating its presence, but also has means to indicate its profile.

It is yet a further objective of the invention to provide a portable mechanical locking device for a motor vehicle having means to signal the user thereof that an access lock associated therewith is secure.

It is a further objective of the present invention to provide a portable vehicle locking device having its own independent source of power, illumination means for indicating and/or signalling its presence, and power conservation means responsive to engagement and/or securement of the device so that power is consumed only when the locking device is engaged and/or secured.

It is a further objective of the present invention to provide a portable locking mechanism including illumination means which automatically operates in darkness and becomes deactivated in daylight conditions thereby to prevent unnecessary power consumption.

SUMMARY OF THE INVENTION

In accordance with the present invention, substantial physical damage is prevented by providing illumination means with a mechanical locking device so that a would be thief is warned prior to forcible entry that his effort will likely be futile. In a preferred utilization of the invention, a mechanical locking device, such as a J-bar, includes shackle means for engaging both the steering wheel and the brake pedal of a vehicle, coarse and fine adjustment means for adjustably engaging varied structures, an access lock such as a key and cylinder for securing the shackle means in place, and illumination means connected with the locking device to notify/deter a prospective thief and to signal securement of the access lock.

In a preferred embodiment, the illumination means preferably comprises a source of power, engagement sensing means for activating the source of power when the mechanical lock is in use, profile lighting means for indicating in darkness the profile of the locking device, and preferably a securement sensing means for indicating to the user that the access lock is secure. A photodetector may optionally be employed to deactivate the illumination means during daylight conditions thereby to prevent unnecessary power drain.

These and other objectives of the invention will become more readily apparent upon review of the succeeding disclosure taken in connection with the accompanying drawings. The invention thought is pointed out with particularity by the appended claims.

DETAILED DESCRIPTION OF THE INVENTION

Figure 1:
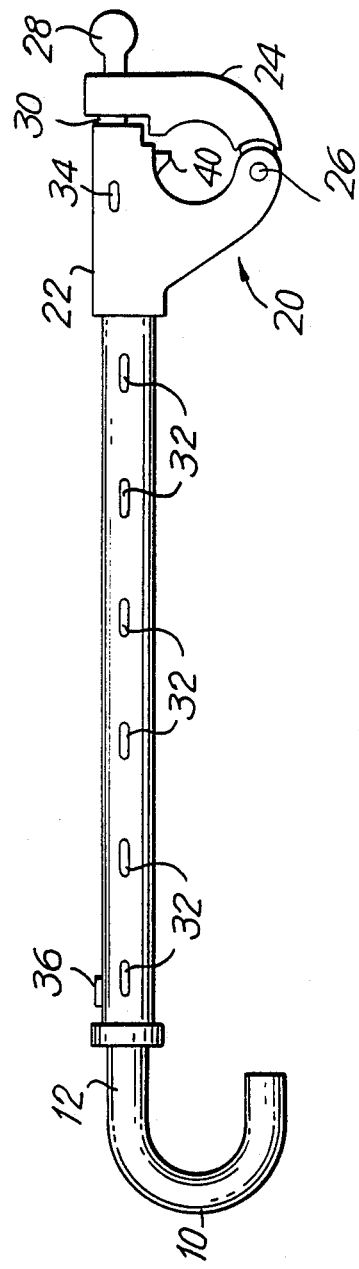
FIG. 1 illustrates the principles of the present invention relative to a typical antitheft locking mechanism.

FIG. 1 shows a conventional mechanical locking device, e.g., a J-bar, for a motor vehicle which incorporates the present invention. The J-bar comprises a hook 10 disposed at the end of rod 12 which telescopically extends through the sleeve 14 of the J-bar assembly. Typically, the telescopic extension include coarse and fine adjustment means, as known in the art. The hook 10, when employed to secure the vehicle, clamps around the arm of the vehicle's brake pedal (not shown). A shackle assembly 20 clamps to a portion of the vehicle's steering wheel and comprises a sturdy housing 22 adjoining the sleeve 14 and a pivotal locking clamp 24 which is hinged to housing 22 by a steel pin 26. A key-cylinder arrangement 28,30 is journaled through clamp 24 so as to permit locking of the housing-clamp assembly 22,24 around the vehicle's steering wheel.

The external portion of the mechanical locking device in the preferred embodiment, includes a plurality of lighting elements 32 and 34 generally arranged to indicate its elongated profile along the top and/or sides thereof to indicate its general shape. Lighting elements may also be disposed on the hook 10. Preferably, the lighting elements consists of light emitting diodes, since they are known to consume little power as compared with incandescent lamps. A photodetector 36, disposed on the lower portion of sleeve 14 (as normally oriented in actual use), senses light levels to enable activation of lighting elements during low light conditions. A contact switch 40 disposed in the inner loop of the shackle assembly 20 enables activation of a power source in the housing when the shackle 20 couples the steering wheel of the vehicle. A power source, such as a battery, may be located in the sleeve 14 or housing 22. Lighting element 34 may advantageously operate with a microswitch to sense securement of the lock by key/cylinder arrangement 28,30 so as to visually communicate to the user locking of clamp 24 to housing 22. Such key cylinder switches are well-known in the art.

Thus, according to a preferred arrangement of the invention, a lighting means 34 is provided to indicate securement of the access lock 28,30, a switch means is provided to energize the power source to power lighting elements 32 upon coupling of shackle 20 to the vehicle steering wheel, and a low light level detecting means is provided to conserve power in day light conditions.

Figure 2:
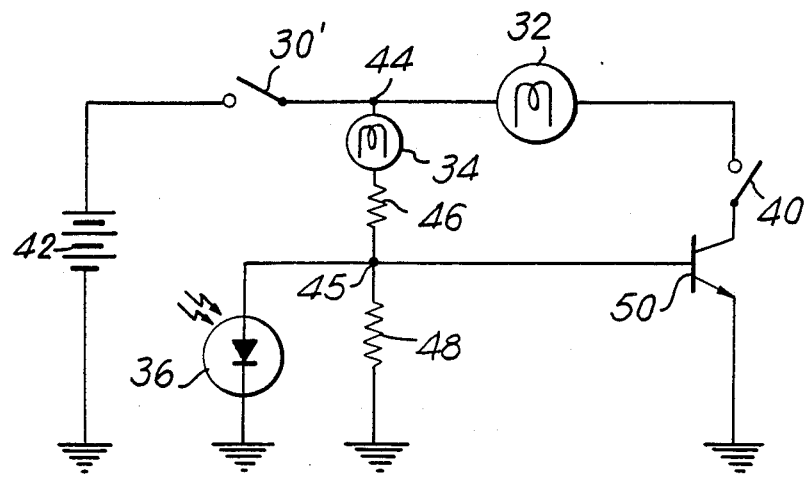
FIG. 2 depicts an electrical circuit embodied in the locking mechanism of FIG. 1.

FIG. 2 depicts an electrical circuit embodied in the mechanical locking device of FIG. 1 for carrying out the aforestated tasks. Where appropriate, like reference numerals in the Figures are used to identify like elements. A source of power, such as a battery, is arranged in the housing 22. Upon securing the access lock, a microswitch 30' operative with cylinder 30, closes to couple a voltage potential to node 44. Current then flows through l.e.d. lamp 34 and series-connected resistors 46 and 48 which serve a current-limiting function, and also as a voltage divider network which turns on transistor 50 to a conduction state. Transistor 50, however, does not conduct until switch 40 closes, e.g., engagement of the shackle 20 to steering wheel. When the microswitch 30' and contact switch 40 are closed, transistor 50 provides a current path from source 42 to illuminate lighting devices 32. Of course, the current path through transistor 50 is complete only during low light conditions as sensed by the photodetector 36.

During daylight conditions, light rays impinge upon photodiode 36 which pulls down node 45 to near ground potential, which in turn, drives the base of transistor 50 below cut-off. Below cut-off voltage, transistor 50 no longer conducts and lamps 32 extinguish. However, lamp 34 remains activated by virtue of a current path through resistor 46 thereby to provide means for indicating the active status of the locking mechanism during daylight conditions.

Figure 3:
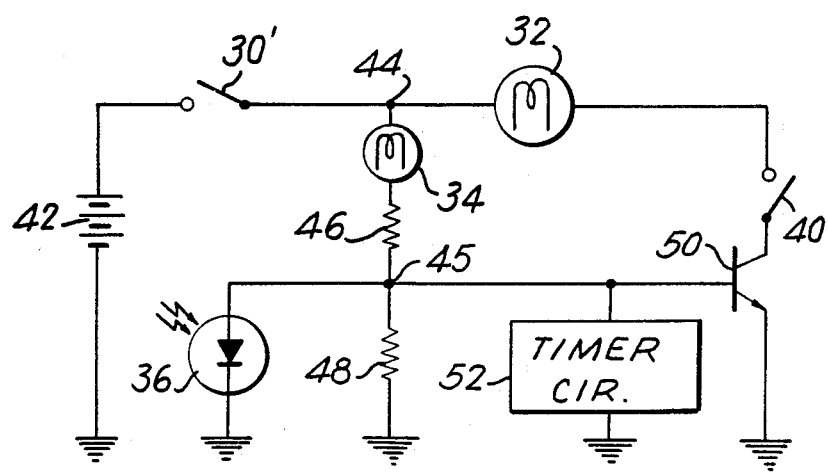
FIG. 3 depicts an alternative electrical circuit embodied in the locking mechanism of FIG. 1.

As an additional feature, lamps 32 may be operated periodically, sequentially or continuously. To accomplish periodic operation, FIG. 3 is a modified circuit arrangement of FIG. 2. In FIG. 3, a conventional timer circuit 52 is provided periodically to deactivate lamps by coupling periodic grounding pulses to the base of transistor 50. Timer circuit 52 may, for example, comprise a multivibrator or digital counter which are well-known in the art. Periodic operation of lamps 32 conserves power and also provides means for more likely observation of the locking device through a window when employed in a vehicle. In all other respects, the circuit of FIG. 3 operates as described in connection with FIG. 2. Sequential operation of lamps 32 can be similarly arranged by modifying the circuit of FIG. 2 to incorporate a conventional sequential lamp operating circuit.

Since certain changes and modifications may be made to the portable locking mechanism based upon the above teachings, it is the intent of the inventor to include in the subject matter of his invention all such modification as may come to those skilled in the art. For example, the invention has application to portable locking devices generally used with motor vehicles and has as an important objective, to deter physical damage during break-in due to the inability to "see" or notice the anti-theft device during low light conditions. A J-bar is shown as illustrative of the application of the invention, but it is not so limited. The invention has application in other portable vehicle locking devices. Thus, the invention is not limited to the illustrated drawings and specification.

What is claimed to be secured by U.S. Letters Patent is:

1. A portable steering wheel locking mechanism having a profile for use with a motor vehicle having a steering wheel and a brake pedal, said locking mechanism comprising:
   an elongated member having opposed first and second ends, brake pedal engaging means disposed on the first end of said elongated member for coupling the brake pedal of the vehicle,
   steering wheel engaging means disposed on the second end of said elongated member for coupling the steering wheel of the vehicle,
   access locking means having secured and unsecured positions and also being disposed on the second end of the elongated member for securing the locking mechanism in place, and illumination means for signalling presence of said steering wheel locking mechanism with said motor vehicle, said illumination means including a source of power, luminous means disposed on said locking mechanism and powered by said source of power for visually indicated the profile of said locking mechanism, and condition responsive means for sensing engagement of said locking mechanism and for activating said source of power to energize said luminous means,
   said luminous means further comprising a plurality of light emitting diode elements disposed on said locking mechanism and periodic lighting means for periodically activating said diode elements thereby to conserve power during operation.

2. A portable locking mechanism as recited in claim 1 wherein said condition responsive means comprises switch means responsive to engagement of said steering wheel engaging means with said steering wheel thereby to activate said source of power only when the locking mechanism is in use.

3. A portable locking mechanism as recited in claim 1 wherein said condition responsive means comprises switch means responsive to the secure position of said access lock thereby to activate said source of power.

4. A portable locking mechanism as recited in claim 1 wherein said luminous means includes means to effect periodic flashing of said light emitting diode elements.

5. A portable locking mechanism as recited in claim 1 wherein said luminous means includes means to effect sequential activation of said light emitting diode elements to indicate the profile of said locking mechanism.

6. A portable locking mechanism as recited in claim 1 further comprising photodetector means for sensing daylight conditions and for deactivating said illumination means thereby to conserve said source of power.

7. A portable steering wheel locking mechanism having a profile for use with a motor vehicle having a steering wheel and a brake pedal, said locking mechanism comprising:

an elongated member having opposed first and second ends, brake pedal engaging means disposed on the first end of said elongated member for coupling the brake pedal of the vehicle, steering wheel engaging mean disposed on the second end of said elongated member for coupling the steering wheel of the vehicle, access locking means having secured and unsecured positions and also being disposed on the second end of the elongated member for securing the locking mechanism in place, and illumination means for signalling presence of said locking mechanism with said motor vehicle, said illumination means including a battery, a plurality of lighting elements disposed on said locking mechanism and powered by said source of power for visually indicating the profile of said locking mechanism, condition responsive means for sensing engagement of said locking mechanism with said steering wheel and for activating said source of power to energize said lighting elements, and a photodetector for enabling said battery to power said lighting elements in low light conditions.

* * * * *